(12) United States Patent
Han

(10) Patent No.: US 10,031,971 B2
(45) Date of Patent: Jul. 24, 2018

(54) SYSTEM AND METHODS FOR OPTIMIZING THE RESPONSE TO A REQUEST FOR DYNAMIC WEB CONTENT

(71) Applicant: Netsuite Inc., San Mateo, CA (US)

(72) Inventor: Yu Zhe Han, Burlingame, CA (US)

(73) Assignee: NETSUITE INC., San Mateo, CA (US)

( * ) Notice: Subject to any disclaimer, the term of this patent is extended or adjusted under 35 U.S.C. 154(b) by 416 days.

(21) Appl. No.: 14/150,356

(22) Filed: Jan. 8, 2014

(65) Prior Publication Data

US 2017/0235829 A1    Aug. 17, 2017

Related U.S. Application Data

(60) Provisional application No. 61/750,766, filed on Jan. 9, 2013.

(51) Int. Cl.
*G06F 17/30* (2006.01)
*G06F 17/22* (2006.01)

(52) U.S. Cl.
CPC .... *G06F 17/30864* (2013.01); *G06F 17/2247* (2013.01)

(58) Field of Classification Search
CPC ............... G06F 17/30; G06F 17/30386; G06F 17/30905; G06F 17/30864; G06F 17/30902; G06F 17/30911; G06F 17/30893
See application file for complete search history.

(56) References Cited

U.S. PATENT DOCUMENTS

| | | | |
|---|---|---|---|
| 6,546,397 B1 * | 4/2003 | Rempell | G06F 8/20 |
| 2003/0191737 A1 * | 10/2003 | Steele | G06F 17/30864 |
| 2004/0260722 A1 * | 12/2004 | Allen | G06F 17/30887 |
| 2011/0246524 A1 * | 10/2011 | Wu | G06F 21/6209 707/781 |
| 2012/0265802 A1 * | 10/2012 | Shen | H04L 67/02 709/203 |

* cited by examiner

*Primary Examiner* — Amanda L Willis
(74) *Attorney, Agent, or Firm* — Cooper Legal Group, LLC

(57) ABSTRACT

A system and associated methods for responding to a request for a web page containing dynamic content by generating and delivering a static version of the requested page and content. Specifically, embodiments are directed to a system and methods for receiving a request for dynamic web content at a server, instantiating a virtual browser within an execution environment running on the server, loading the requested dynamic web content into the virtual browser, executing the executable content of the requested dynamic web content (thereby creating a corresponding static version of the requested dynamic web content), and delivering the static version in response to the request.

21 Claims, 5 Drawing Sheets

SYSTEM AND METHODS FOR OPTIMIZING THE RESPONSE TO A REQUEST FOR DYNAMIC WEB CONTENT

CROSS REFERENCE TO RELATED APPLICATION

This application claims the benefit of U.S. Provisional Application No. 61/750,766, entitled "Methods and Systems for Optimizing the Response to a Request for Dynamic Web Content," filed Jan. 9, 2013, which is incorporated herein by reference in its entirety (including the Appendix) for all purposes.

BACKGROUND

The ability of businesses to conduct transactions with customers (as well as with other businesses) over the Internet using "online storefronts" has enabled such businesses to greatly expand their potential customer base while substantially reducing costs related to maintaining "brick and mortar" businesses. However, such transactions, handled at a distance and not face-to-face, also present unique problems, for example with regards to how merchants make their products or services known to potential buyers.

A web browser (sometimes referred to as a client browser or a browser) is a client software application primarily used for requesting, receiving, rendering (i.e., presenting), and enabling user navigation of (i.e., the traversal of) website data from websites hosted by remote web servers. Although browsers are primarily intended to be used to navigate and present data contained on web-pages that are part of the World Wide Web, they can also be used to access information provided by web servers that are part of private networks or files residing in local file systems.

A website is typically constructed of a set of related data files called webpages along with other data files containing content (or a "link" to content), such as text, images, video, audio, etc. A website may be hosted on one or more web servers and may thereby be made accessible to remote client computers and applications. This is typically accomplished by using a web "address" known as a uniform resource locator (i.e., a URL, where all publicly accessible websites collectively constitute the "World Wide Web" or Internet). A webpage is a human-readable and computer-readable data file, typically containing text and links to other data files, such as image files. The data is intended to be displayed to a client-user in accordance with computer-readable formatting instructions that communicate to a client-application, such as a web browser, how to display the text and linked data files. Webpages may, for example, be described using (or written in) a "markup" language such as hypertext markup language (HTML) or extensible hypertext markup language (XHTML). Each webpage may contain one or more of text, images, a "button" to activate a recorded audio or video segment, etc. A linking or ordering of a website's webpages conveys a perceived structure of the website to an end user and guides the user's navigation of the website. Many websites include a homepage (or index page), which generally provides basic information about the website, links to the website's other webpages/content, as well as links to supplementary information (such as an "about" page, a "contact" page, and/or a "site map" page). Typically, at the direction of a user, a client application (such as a web browser) will access a webserver and request a particular page of a website (e.g., based on a URL or other form of identifying the location of a desired page). In response, the webserver will transmit the appropriate web page or set of related web pages and other data files to the client application and the application will render the webpage content according to its formatting instructions for display to a user.

Webpages may be static or dynamic, that is they may contain static and/or changeable (i.e., "active") content. A website's static web pages (which may be some or all of the site's web pages) are stored on a web server in the format that is sent to the client web browser, and are commonly written in HTML. Simple forms, fixed examples of webpages/websites (such as might be used for marketing), and other fixed content are often in the form of static websites (i.e., they contain solely or predominantly static web pages), and they present pre-defined, static information to a user. This may include information about a company and its products and services that is provided through text, photos, animations, audio/video segments, and interactive menus and navigation tools. This type of website usually displays the same information to all visitors. Similar to the act of handing out a printed brochure to customers or clients, a static website will generally provide consistent, standard information for an extended period of time. Although the website owner may make updates periodically, it is a relatively simple process to edit the text, photos, and other content and may only require basic website design skills and software tools.

In contrast, a dynamic webpage (i.e., a web page that includes at least some active/dynamic content) displays content that may vary based on parameters provided by a client browser. This permits the web page to be "customized" in response to characteristics of the viewer (demographics, etc.), the viewer's location, the viewer's previous browsing behavior, etc. For example when a user accesses a website's "log-in" page, the user typically provides a user name and password, and activates a log-in "button". In response to the "button" activation, the user's web browser transmits the user name and password to a URL linked to the "button." In response, the web server hosting the website may, rather than deliver a predefined static file, instead execute a script that confirms the user name and password are a valid combination, followed by delivering content selected for that specific user. The user specific content may be selected based on data known about the user based on the current or a previous session, such as user location, the user's previous search histories, the user's "click-through" or purchasing behavior, the user's preferences, etc.

While web pages that include active/dynamic content are able to more accurately provide a user with targeted content, they do have some limitations. One disadvantage of using dynamic webpages/websites is that they are not easily indexed or are not indexable by search engines, because some or all of the content may not be generated until a request is received from a user. Search engines function by scanning and indexing the content of webpages at discreet intervals, and typically do not run executable scripts when they index a site. Dynamic webpages/websites, however, require such script execution to generate a complete version of the webpage or website. Therefore, such dynamic content (i.e., pages/sites) cannot be fully or completely indexed by search engines.

An additional disadvantage of using dynamic content as part of webpages/websites is the additional time it takes to generate a dynamic webpage the first time it is loaded by a given browser. This is because dynamic web sites must transmit more information back and forth over the network during script execution to ensure that the web page is correctly rendered for display to a user.

Unfortunately, conventional techniques for addressing these disadvantages of using dynamically generated content are not satisfactory and may create disincentives to using dynamic content in some situations. This is unfortunate as dynamic content provides benefits for both end-users and website owners. For example, one technique for allowing dynamically-generated websites to be searched is to use a server side technology to create a corresponding site on a server. The server generated site does not use the executable scripts, but instead produces the corresponding content in static form so it can be indexed by a search engine. When a request is received for a webpage, a server process may be used to decide to serve the page from either the dynamic site or from the static site based on the User-Agent HTTP header, which identifies whether the request is coming from a search engine or from an end user's browser. However, this approach requires two versions of the website to be built, maintained, and synchronized (so that changes to one version of the site can be duplicated on the other). In addition, some dynamic features, such as accessing product reviews from a third party site, may not be possible to produce accurately on the server version, as the third party sites typically also rely on dynamically generated content.

An alternative approach to dealing with the problems related to searching that are created by the use of dynamic content is to use a template framework that can be generated on a server as well as on a client. In such an approach, one or more templates that are used to create a site on the client side can also be used on the server. However, in order to do this, the server generated site typically utilizes a set of templates created with similar, but more limited functionality. This is because the server may not be able to process some of the "arbitrary" content that may be present in the set of templates used to generate the client side webpages/ website that include the dynamic content. As a result, at least some of the web pages would be rendered using a template with reduced capabilities, since the server would be limited to simple template substitution.

This creates a problem for the website development process, as a site developer would need to maintain two copies of each template in parallel, one for the dynamic site and a second for the static site, and these could easily become unsynchronized. This would cause the static site to have contents that did not look identical to the dynamic site. Search engines penalize sites that appear different to the search engine than they appear to actual users (this is a process termed "cloaking") and such an approach would therefore be rendered ineffective or at least undesirable. Further, as noted with regards to the approach of maintaining a second server-based website, many websites utilize additional third party content in webpages and that content may not use compatible templates, and thus cannot be generated on the server. In such a case, some or all of such content would not be indexable (and the differences between the website content might lead to a search engine assuming that "cloaking" was being practiced).

With regards to the loading of pages containing dynamic content, conventional approaches to optimizing the load time of dynamic content by a client browser are unsatisfactory because they typically address optimizing database and server access, and script execution. While beneficial, this approach has limited value, as it may not be scalable or extendible between different server environments and/or architectures. Similarly, conventional approaches to permitting a dynamically generated webpage/website to be fully indexable by a search engine and to be loaded relatively quickly by a client browser application have disadvantages related to accuracy, efficiency and the resources needed to implement those approaches. Embodiments of the invention address this and other needs both individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. This summary is a high-level overview of various aspects of the inventive system and methods for responding to a request for a web page containing dynamic content by using a virtual browser to generate and deliver a static version of the page and the requested content.

Embodiments of the invention are directed to a system and associated methods for responding to a request for a web page containing dynamic content by generating and delivering a static version of the requested page and content. Specifically, one or more of the embodiments described herein are directed to a system and methods for receiving a request for dynamic web content at a server, instantiating a virtual browser within an execution environment running on the server, loading the requested dynamic web content into the virtual browser, executing the executable content of the requested dynamic web content (thereby creating a corresponding static version of the requested dynamic web content), and delivering the static version in response to the request. Embodiments of the invention overcome the disadvantages of conventional solutions to the problems posed by the use of dynamic content as part of web pages with regards to searching and indexing such content, while providing a scalable and more efficient mechanism for generating, delivering, and loading web pages containing dynamic content.

Embodiments of the invention utilize a virtual browser to ensure that a corresponding static page will be generated using an identical interpretation of any applicable customizations, and will therefore result in a page that renders identically to the dynamic version of the page. This is accomplished using a single set of templates (and therefore the templates can contain arbitrary, user-defined scripting and content, so long as the browser supports it), and does not introduce the risk of incurring a search engine penalization for "cloaking".

In one embodiment, the invention is directed to a method for responding to a request for a web page containing dynamic web content from an external requestor, where the method includes:

receiving a request for the web page;

instantiating a virtual browser;

loading a file corresponding to the dynamic web content of the web page into the virtual browser, the file containing at least one instruction executable by the virtual browser, wherein the execution of the at least one instruction causes static content to be returned;

operating the virtual browser to execute the at least one instruction;

receiving static content in response to executing the at least one instruction; and transmitting the static content to the external requestor.

In another embodiment, the invention is directed to an apparatus for responding to a request for a web page containing dynamic web content from an external requestor, where the apparatus includes:

a processor programmed to execute a set of instructions a data storage element in which the set of instructions are stored, wherein when executed by the processor the set of instructions cause the apparatus to receive a request for the web page;

instantiate a virtual browser;

load a file corresponding to the dynamic web content of the web page into the virtual browser, the file containing at least one instruction executable by the virtual browser, wherein the execution of the at least one instruction causes static content to be returned;

operate the virtual browser to execute the at least one instruction;

receive static content in response to executing the at least one instruction; and transmit the static content to the external requestor.

In yet another embodiment, the invention is directed to a system for processing a request for a web page containing dynamic web content, where the system includes:

a source of the request for the web page containing dynamic web content; and an apparatus for responding to the request, wherein the apparatus further comprises a processor programmed to execute a set of instructions a data storage element in which the set of instructions are stored, wherein when executed by the processor the set of instructions cause the apparatus to receive the request for the web page;

instantiate a virtual browser;

load a file corresponding to the dynamic web content of the web page into the virtual browser, the file containing at least one instruction executable by the virtual browser, wherein the execution of the at least one instruction causes static content to be returned;

operate the virtual browser to execute the at least one instruction;

receive static content in response to executing the at least one instruction; and transmit the static content to the source.

Other objects and advantages of the present invention will be apparent to one of ordinary skill in the art upon review of the detailed description of the invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
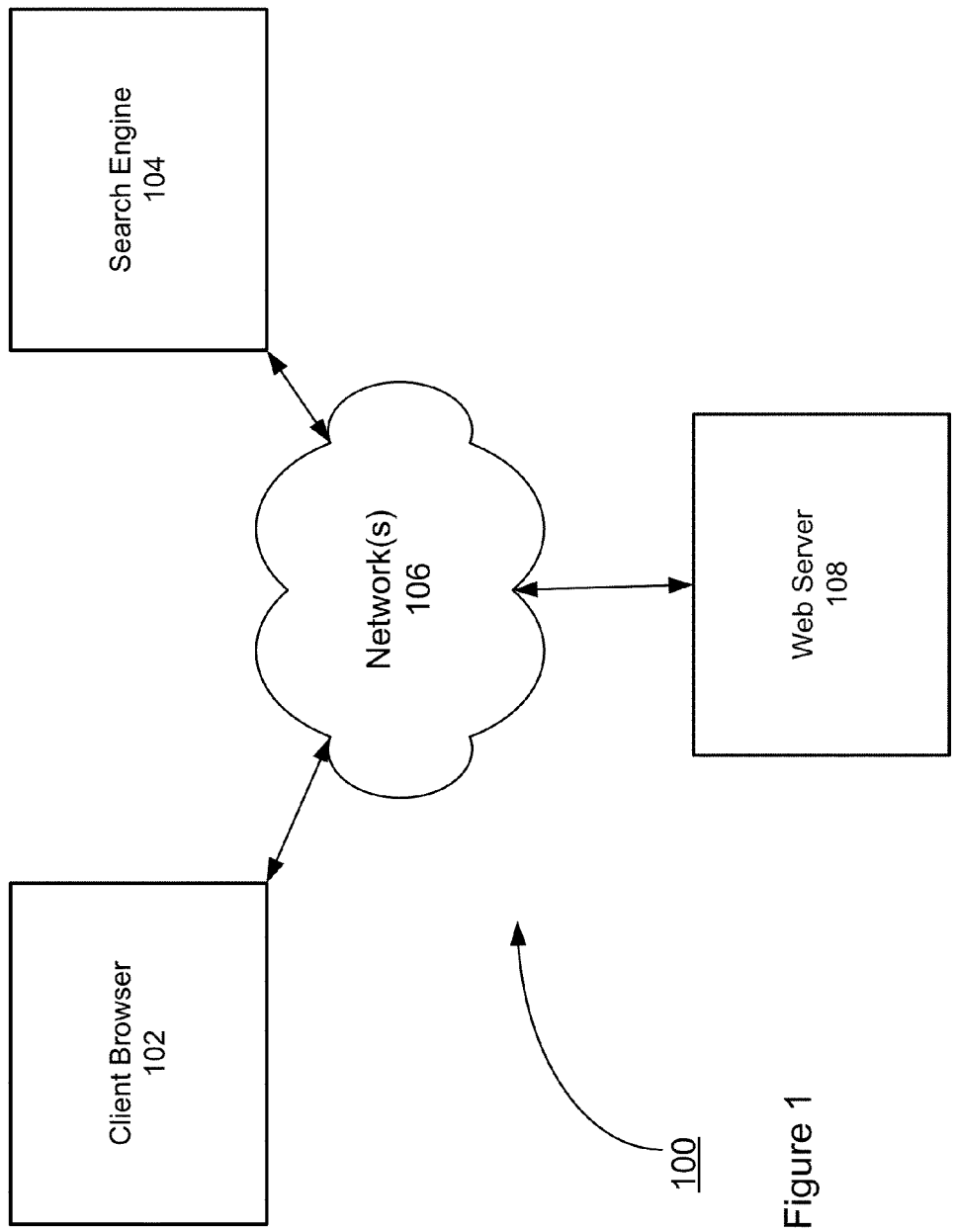
FIG. 1 is a block diagram illustrating the interconnectivity between a web server, a client browser, and a search engine, and represents an architecture or operating environment in which an embodiment of the invention may be implemented.

This description discusses illustrative embodiments of the inventive system and methods for responding to a request for a web page containing dynamic web content. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee (s) claim exclusive entitlement.

The subject matter of one or more embodiments of the invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying or requiring any particular order or arrangement among or between various steps or elements except when the order of individual steps or arrangement of elements is explicitly required.

Embodiments of the invention will be described more fully herein with reference to the accompanying drawings, which form a part hereof, and which show, by way of illustration, exemplary embodiments by which the invention may be implemented and practiced. The invention may, however, be embodied in different forms and should not be construed as limited to the embodiments set forth herein; rather, these embodiments are provided so that this disclosure will be thorough and complete, and will convey the scope of the invention to those skilled in the art.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a server and an associated data storage element or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As noted, many current websites are robust and feature rich, providing significant advantages to both the operators and users of the websites. However, the development of such websites can be an extremely time consuming and complex process, and it is desirable to avoid introducing additional processes that increase the development time and/or introduce additional sources of potential error. This is one reason why adopting a process for enabling indexing of webpages/websites containing dynamic content that requires maintaining a set of static page template files in parallel with the ones that are used to construct the dynamic page is undesirable, as that approach increases both the labor required and the risk of errors.

In contrast, embodiments of the invention utilize a virtual browser executing on a server to ensure that a static (and hence indexable) page will be generated using an identical interpretation of any applied customizations, and will therefore result in a page that renders identically to the dynamic version of the page. This is accomplished using a single set of templates (and therefore the templates can contain arbitrary, user-defined scripting and content, so long as the browser supports it), and does not introduce the risk of incurring a search engine penalization for "cloaking".

A request to a server for a dynamic web page or a web page containing dynamic content can be generated from a client browser (e.g., a software application executing on a user's client device) or by a search engine accessing a webpage/website hosted by the server. Such a request by a search engine may be part of the engine indexing webpages/websites for later use in responding to search requests (e.g., where a user enters one or more keywords into a search engine user interface and the search engine returns the results of a search query, where those results may include a URL corresponding to a webpage or website which the user can then access using their browser application). Conventionally, a webserver may deliver content consisting of executable scripts in response to such a request. In the event that the requestor is a client browser, the browser will then execute the scripts. As part of this process, the client browser may make additional requests for content in response to the executing scripts. This is time consuming, uses a relatively large amount of bandwidth, and causes the content to take a relatively long time to be displayed to the user by the browser.

In the case where the requestor is a search engine, the search engine may not execute one or more of the scripts, and therefore some of the content that would be accessed if the web page was being requested by a client browser is not sent to the search engine. Consequently, the un-accessed content is not indexed and therefore is not available for use in responding to later search requests by a user. As noted, this may make the page as seen by the search engine look different from the page as seen by an end user, and as a result the search engine may penalize the website for "cloaking" (which typically includes doing anything that could be interpreted as an attempt to deceive the search engine).

For the benefit of both users and businesses, it is desirable that a link or links to a website be returned when a consumer or other Internet user enters relevant keywords into a search engine, and the design of many commercial websites takes this into account. The phrase "search engine optimization" (SEO) describes the practice of designing a website to increase the chances that the site will be identified as containing information of interest to the person who entered the keyword(s) into the search engine. Dynamic websites or websites with dynamic content present a problem for effective SEO because contemporary search engines do not execute scripts when indexing dynamic pages (i.e., pages of a website that contain active or dynamic content). As a result, the dynamic content of a webpage may not be accessible or accounted for when presenting search results. This is undesirable because that content might be relevant in responding to a search query if it was present in a static webpage.

As recognized by the inventor, a system and method that improves the efficiency and accuracy of responding to requests for webpages containing dynamic content would be preferable to use of the conventional approaches that address the difficulties created by dynamic content. Preferably, such a system and method would be scalable and extendible to multiple server environments and/or architectures. In accordance with at least one embodiment of the inventive system and methods, a method for a webserver to respond to a request for a webpage containing dynamic web content by using a virtual browser to return the static result of the dynamic content is described herein.

FIG. 1 is a block diagram illustrating the interconnectivity between a web server, a client browser, and a search engine, and represents an architecture or operating environment 100 in which an embodiment of the invention may be implemented. As shown in the figure, a user (not shown) operates a device in which is installed a client browser 102. Client browser 102 is typically an application that can be used to generate a request for a web page. The request is typically formulated in a standard format and communicated over a network 106 to a web server 108. Network 106 may be a wired network, a wireless network or a combination of the two technologies (e.g., the Internet).

A search engine 104 may be used by a user to enter a search query and to provide suggested websites or webpages to the user in response to the query. Typically, the search query will be generated by search engine 104 in response to one or more keywords provided by the user to a user interface of search engine 104 (in some cases a user may also provide logical connections between one or more of the keywords). Client browser 102 may communicate a search request to search engine 104 using a search engine application installed on the same device as client browser 102. The search request may be communicated from the client device over network 106 to a server or servers that execute the functions and operations of search engine 104. The response to the user's search query may then be communicated over network 106 to the user's device and displayed to the user by client browser 102. The user may then request a webpage or website that is contained in the search results, typically by activating a link (i.e., a URL).

Search engine 104 (or a server associated with search engine 104) typically stores information about the content of webpages and websites in order to be able to respond to a user's search requests. In order to obtain this information, search engine 104 may cause webpages and websites to be examined and indexed (a process sometimes referred to as "crawling" a webpage or website). However, as noted, the indexing process may fail to take into account dynamically generated content, and as a result, a search engine may not be able to properly include webpages or websites that contain dynamic content when responding to a search query. This limits both the accuracy of the search results and the utility of the results to a user.

Figure 2:
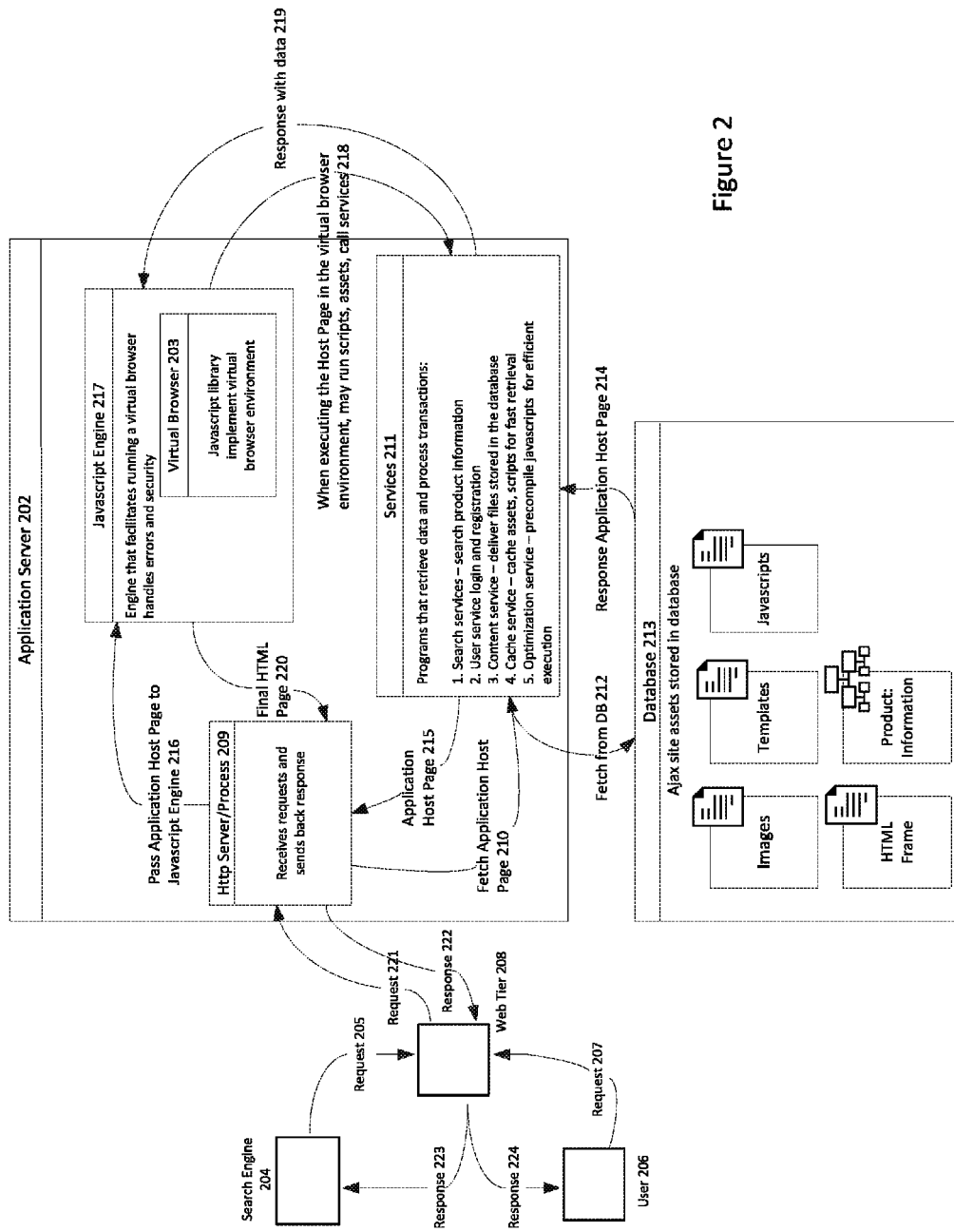
FIG. 2 is a functional block diagram illustrating the interactions of various elements that may be part of an implementation of an embodiment of the invention.

FIG. 2 is a functional block diagram illustrating the interactions of various elements that may be part of an implementation of an embodiment of the invention. Referring to the figure, an embodiment of the inventive system and methods includes an Application Server 202 (which may include capabilities to function as a web server) that includes a programmed processing element executing one or more software instructions that cause the server to implement the functionality of a "Virtual Browser" 203 (where this may include an emulation of a browser application). Note that in FIG. 2 the virtual browser is depicted as being implemented by a JavaScript engine, but that embodiments of the invention are not limited to those implemented using that technology. For example, although current browsers typically support only the JavaScript scripting language, JavaScript can be extended in various ways and embodiments of the invention will support such extensions. Further, should browsers be implemented with support for additional languages, the invention will also support them and continue to provide static content that is consistent with the corresponding dynamic content.

As shown in the figure, in one embodiment, a search engine 204 may generate a request 205 for a web page. Similarly, a consumer or other user 206 may generate a request 207 for a web page. The request 205 or 207 may be received by a Web Tier 208 which represents one or more elements of infrastructure that enable the User (or search engine) to communicate through the Internet to the destination Web site. Request 205 or 207 is communicated (as suggested by Request 221 in the figure) to an executable process or computing/data processing element that functions to receive and process requests for web pages to enable those requests to be used to access stored data used to construct web pages (as suggested by Http Server/Process 209 in the figure). This may include performing data conversions, data or protocol element formatting, constructing messages, message headers, etc.

In response to the request 205 or 207, Http Server/Process 209 executes one or more operations that function to "fetch" an application host page 210. The application host page is a webpage which is based on some processing of the HTML Frame (which resides in Database 213) through processes and actions that rely on information returned by services 211. The fetching function may include co-ordination with a Service 211 that represents an application that controls access to the data (and use of the data) used to construct the requested web page. Service 211 may process the "fetch" request for the application host page and generate one or more requests 212 for data and/or other elements used to construct the host page to Database 213. As shown, Database 213 stores elements, components and data used to construct the host page, and may include images, templates, product information, etc. In response to requests 212, Database 213 provides the application host page 214. The host page may be processed further by Services 211 before being provided 215 to Server/Process 209. Server/Process 209 passes the host page (as suggested by element 216 in the figure) to Engine 217, which as noted may be used to implement Virtual Browser 203. Virtual Browser 203 executes instructions that permit it to function as a browser to enable the generation, display, and navigation of a web page. In doing so Virtual Browser 203 may execute scripts, access data, call a service, etc. (as suggested by elements 218 and 219 in the figure). Virtual Browser 203 controls the generation of the requested web page and provides the resulting page to Server/Process 209 (as suggested by element 220 in the figure, and which as noted represents a static webpage). Server/Process 209 then provides the web page as a response 222 to request 205 or 207 to Web Tier 208, from which the requested page is provided to Search Engine 204 or User 206 (as illustrated by Response 223 or Response 224 in the figure).

Figure 3:
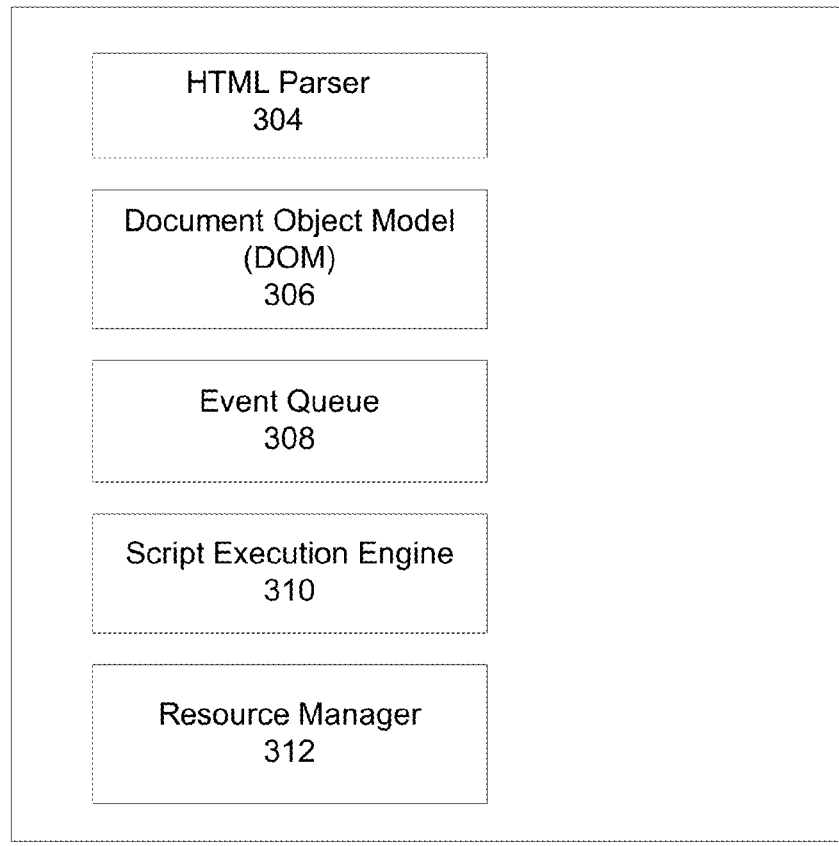
FIG. 3 is a functional block diagram illustrating the primary components or elements of an exemplary virtual browser which may be used in implementing an embodiment of the invention.

FIG. 3 is a functional block diagram illustrating the primary components or elements of an exemplary Virtual Browser 300 (for example, Virtual Browser 203 of FIG. 2) which may be used in implementing an embodiment of the invention. Virtual Browser 300 may include functions, processes, methods, components, or elements that operate to provide the functionality of an HTML parser 304, a document object model (DOM) 306, an event queue 308, a script execution engine 310, and a resource manager 312. In one embodiment, Virtual Browser 300 emulates (or simulates) an external client browser in the act of accessing a web page hosted on a web server and causes a Server (e.g., element 202 of FIG. 2) to generate the dynamic content of the webpage in the same or an equivalent manner as though the external client browser had accessed the web page. In one embodiment, Virtual Browser 300 may advantageously be executed inside a scripting execution environment (e.g., element 217 of FIG. 2) embedded in the Server. In addition to the scripting environment, the Server may contain caching and/or optimization capabilities (e.g., services element 211 of FIG. 2) that operate to speed up the execution/construction of an application host page, allowing the page to be rendered more rapidly using a browser. Note that the caching services may be used to speed up both the generation of the static page in the virtual browser, as well as rendering of the dynamic page in the end user's browser, as both use cases invoke the same or similar services in a uniform way.

Figure 4:
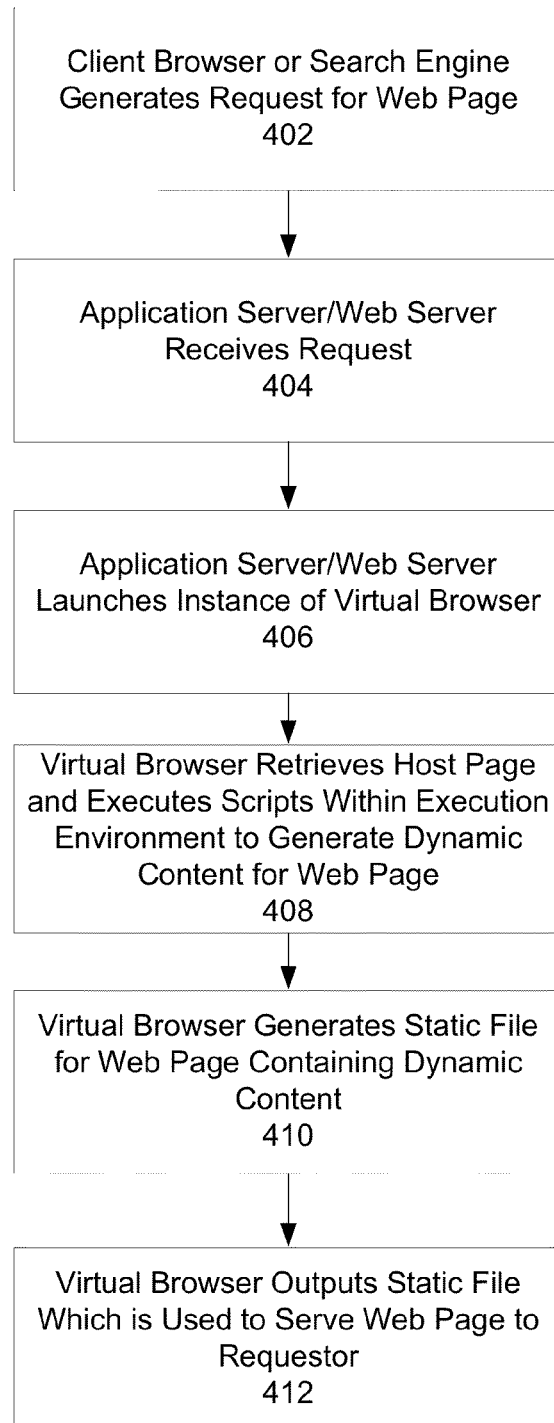
FIG. 4 is a flow chart or flow diagram illustrating the primary functional steps or stages of a process, method, function, or operation that may be implemented as part of an embodiment of the invention.

With reference to FIG. 1 and FIG. 4 (which is a flow chart or flow diagram illustrating the primary functional steps or stages of a process, method, function, or operation that may be implemented as part of an embodiment of the invention), a Server (such as Application Server 202 of FIG. 2, which may function at least in part as a web server) may receive an external request to deliver web content (step or stage 402). As described, such a request may come from a client browser or from a search engine. When the Server receives a request, it calls a content service to fetch the requested application host page, where an application host page is a HTML document that hosts the executable scripts that create the dynamic content of a webpage. This may involve launching an instance of a Virtual Browser (step or stage 406), as illustrated, for example, by element 203 of FIG. 2 and/or element 300 of FIG. 3. The virtual browser instance fetches or otherwise retrieves the host page, and then controls generation of the page's dynamic content inside the virtual browser environment (step or stage 408). When scripts inside the application host page are executed, they may fetch additional data and/or content from other locations, such as a database or other servers on a network. The data may, for example, correspond to product information, templates, related items, recommendations, images, audio or video files, etc. The data is assembled in accordance with the executing scripts and added to the virtual browser's document object model (for example, element 306 of FIG. 3). Once the scripts have completed being executed, the virtual browser generates a static file that corresponds to the completed web page (step or stage 410) and a final HTML document (or other form of static content) is output, where this document is "served" in response to the initial request from the external browser, search engine, or other application (step or stage 412).

Note that as mentioned, both client browsers and search engines may request a page from a website. The application server receives the request, and passes control to the virtual browser (or to an instance of a virtual browser). The virtual browser operates to emulate a server-side browser application (without a displayed output) and serves to execute the script(s) in the webpage/site. In one embodiment, the virtual browser functions to generate the requested website page dynamically based on one or more of templates, service calls that return relevant data for the page, and template substitution scripting. The content of the page is filled in, as it would be in a physical browser, but these operations occur server-side. The DOM (document object model) of the virtual browser is then compiled (e.g., into flat HTML, which is equivalent to the final outcome of the dynamic page). This content is then returned to the requestor as a fully static page. Note that this format permits a search engine to find links, parse them, and "discover" other pages in the site, thereby permitting full website indexing. Embodiments of the invention are capable of beginning with an arbitrary scripted and customized dynamic site and converting it to a format that is indexable.

Note that a webpage may contain multiple executable scripts, and it may be desirable to not execute all such scripts in the course of generating the webpage using the virtual browser. For example, in one embodiment the inventive system and methods may be used to distinguish between internal scripts (those that are hosted in the same domain as the application server) which should be executed in the course of generating the webpage using the virtual browser and external scripts (those that are hosted in an external domain), which preferably should not be executed.

However, there may be cases where the distinction between which scripts to execute and which not to execute may require further definition or refinement (i.e., rather than being determined solely by the internal or external designation). For example, if it is advantageous to run a specific external script, then that script may be copied into the internal domain and thereby executed. Similarly, if it is advantageous to not run a specific internal script, then a "do-not-execute" flag may be introduced into the script in accordance with the inventive system and methods, thereby preventing its execution by the virtual browser.

For example, a script that might be undesirable to run on the server (virtual browser) side would be an analytics script that sends information to an analytics server that tracks webpage visits. This is because generation of the static page by the virtual browser should not count as a page visit, as the analytics process would typically only want to count pages seen by people as a "hit" for analytics purposes. Therefore, the analytics script could be marked "do-not-execute-server-side", which would cause the inventive system to "push" those scripts into the static page. The static page, when returned to the user in the user's browser, would then run the analytics script(s) and a page visit would be registered by the analytics server. Another example of a script that might be undesirable for the virtual browser to execute would be a script that implements a third party live "chat" with a customer service representative. The server executing the virtual browser would not need to initiate a chat session with such a representative, so those scripts could be pushed to the final static page, enabling the end user's browser to execute the scripts if the end user chose to chat with a customer service representative.

In addition to other uses, embodiments of the inventive system and methods may provide benefits for webpages/websites that are used to input and/or display financial or other sensitive data, by enabling use of a configuration that provides enhanced data security. In one such embodiment, the virtual browser's execution environment may be fully isolated from external access, such as from outside the application/web server's (e.g., element 202 of FIG. 2) firewall application. This provides protection from risks posed by content retrieved from external servers that are not under the control of and/or reside outside the firewall of the system in which the invention is deployed; such sources of content may pose a risk of a security violation or be a source of malicious code. Embodiments of the invention provide a way to prevent the execution of any script(s) or content not under control of the system executing the virtual browser, thereby giving the system control over security and eliminating potentially adverse impacts from external threats.

In the same or another embodiment of the inventive system and methods, enhanced security may be provided by use of a separate virtual browser instantiation for each page request. After the corresponding web content is generated and delivered, the instantiation may be deleted. This approach causes each page generation to occur within a unique execution environment, where after each page generation, the environment and variables are deleted and/or erased. This serves to isolate each request from other requests, and by generating a corresponding unique execution environment, ensures that global variables are not inadvertently shared between different requests or different users. The execution environment may instead or additionally be restricted to only certain application programming interfaces, databases, or internal file systems that the virtual browser may access or otherwise interact with during its operation. In addition, monitoring of the resources accessed by the virtual browser may be performed to reduce the potential for unauthorized or unwanted behavior (such as by restricting or preventing access to certain resources, monitoring the resources accessed and comparing them to a list of suspect resources, etc.).

For example, security may be enhanced by implementing a check for content known to be harmful to the browser environment, such as coding "bugs", infinite loops, or excessive resource utilization. Because the virtual browser environment would typically run on a server in which other virtual browser environments may be simultaneously operating, it is important that it not be possible for one of the virtual browser environments to consume excessive resources (such as CPU time or memory), as this might crash the server or prevent the other virtual browser environments from being able to service other requests, thereby disrupting the system as a whole.

Embodiments of the inventive system and methods may also be adjusted or optimized to handle errors resulting from the execution of the requested dynamic web content. For example, default resource usage limits may be put in place to prevent inadvertent execution errors (such as infinite programming loops) from consuming the application/web server's resources. Additionally, the virtual browser may be designed to mimic the error handling routines/techniques of a client browser application (e.g., if one script out of several on a web page cannot complete due to an internal error, then the remaining scripts may still be executed). This capability is valuable because during website development it is possible that a script which performs a specific function may be implemented incorrectly and may fail. If the error caused page generation to stop, then there would be no page generated, and it would be difficult to diagnose which script caused the failure. By allowing other scripts to run, as much of the page as possible would be generated, with only the failing sections omitted. By studying the static page, a developer could then more quickly determine which script failed to execute properly and make the needed corrections.

Figure 5:
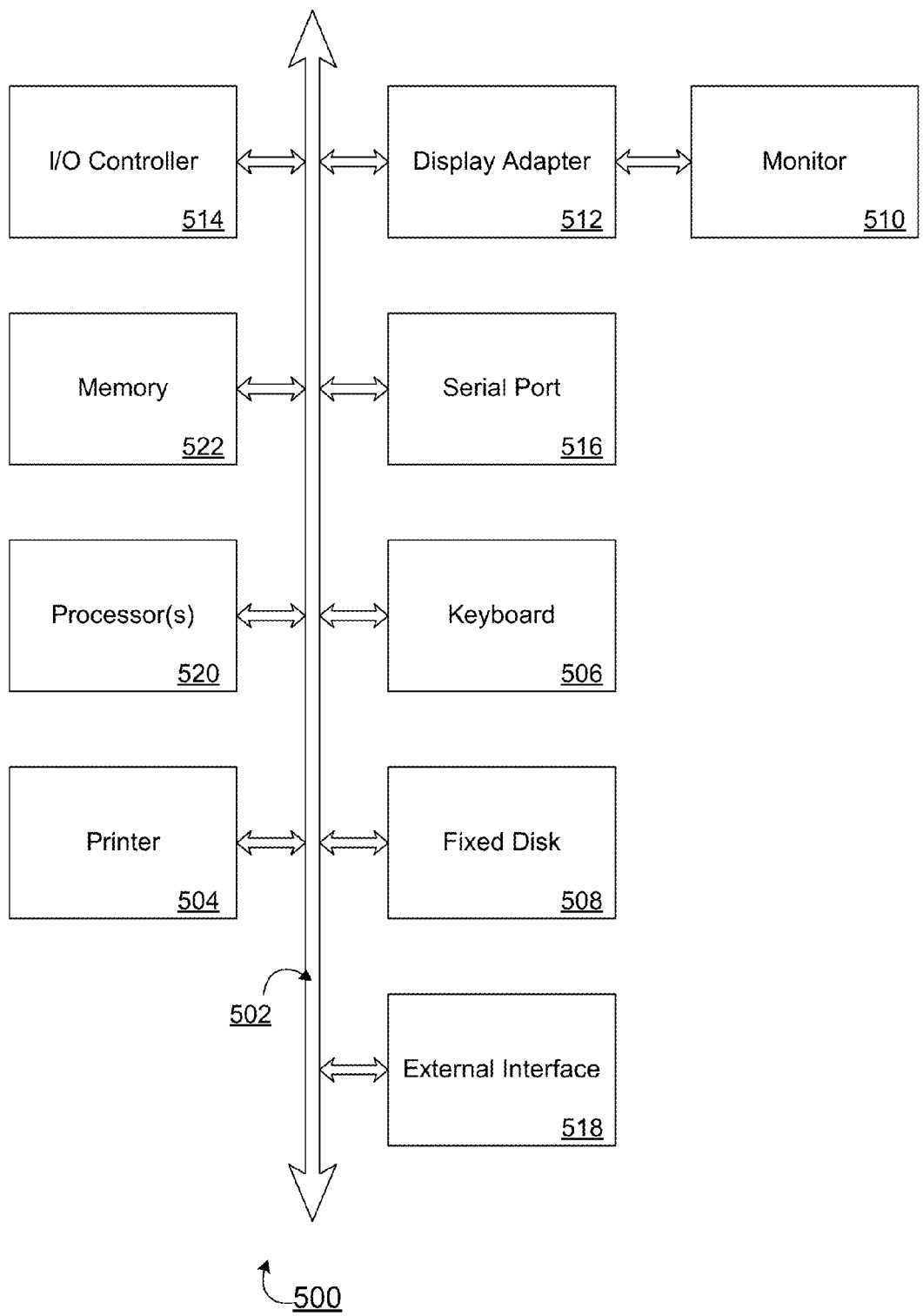
FIG. 5 is a diagram illustrating the components or elements of a non-limiting, exemplary computing architecture suitable for implementing an embodiment of the inventive system and methods.

FIG. 5 is a diagram illustrating the components or elements of a non-limiting, exemplary computing architecture 500 suitable for implementing an embodiment of the inventive system and methods. The architecture 500 includes subsystems interconnected via a system bus 502. They subsystems may include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Exemplary embodiments of the present methods and systems have been described in detail above and in the accompanying figures for illustrative purposes. However, the scope of the present methods and systems are defined by the claims below and is not limited to the embodiments described above or depicted in the figures. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

What is claimed is:

1. A method, comprising:
receiving a request from an external requestor for a web page containing dynamic web content, the request received through an execution environment associated with a tenant among a plurality of tenants in a multi-tenant computing platform;
instantiating a virtual browser in the execution environment;
retrieving data of the web page comprising an executable script;
responsive to determining that the executable script selects user specific content as the dynamic web content based upon parameters associated with the external requestor, operating the virtual browser to execute the executable script and generate a static web page using the data of the web page and the dynamic web content;
responsive to determining that the executable script is hosted in an external domain relative to an internal domain hosting the web page, operating the virtual browser to block execution of the executable script and generate the static web page using the data of the web page; and
transmitting the static web page to the external requestor.

2. The method of claim 1, wherein the static web page comprises HTML of the web page.

3. The method of claim 1, wherein the web page includes one or more of an image, a template, a video, or a link to content.

4. The method of claim 1, wherein receiving the request for the web page further comprises receiving the request from a search engine.

5. The method of claim 1, further comprising:
setting a flag based upon the executable script being hosted in the external domain, wherein the flag is set to indicate that the executable script is not to be executed.

6. The method of claim 1, wherein the web page includes a service call that when activated, causes a search process to be performed.

7. The method of claim 1, wherein the web page includes a service call that when activated, causes an optimization process to be performed.

8. The method of claim 1, further comprising:
responsive to determining that the executable script poses a security risk, blocking execution of the executable script.

9. The method of claim 8, wherein determining if the executable script poses a security risk further comprises determining an action performed by the executable script.

10. The method of claim 1, further comprising authorizing the external requestor requesting the web page to gain access to the execution environment of the tenant.

11. An apparatus, comprising:
a processor programmed to execute a set of instructions;
a data storage element in which the set of instructions are stored, wherein when executed by the processor the set of instructions cause the apparatus to:
receive a request from an external requestor for a web page containing dynamic web content, the request received through an execution environment associated with a tenant among a plurality of tenants in a multi-tenant computing platform;

instantiate a virtual browser in the execution environment;

retrieve data of the web page comprising an executable script;

responsive to determining that the executable script selects user specific content as the dynamic web content based upon parameters associated with the external requestor, operate the virtual browser to execute the executable script and generate a static web page using the data of the web page and the dynamic web content;

responsive to determining that the executable script is hosted in an external domain relative to an internal domain hosting the web page, operate the virtual browser to block execution of the executable script and generate the static web page using the data of the web page; and transmit the static web page to the external requestor.

12. The apparatus of claim 11, wherein the static web page comprises HTML of the web page.

13. The apparatus of claim 11, wherein the web page includes one or more of an image, a template, a video, or a link to content.

14. The apparatus of claim 11, wherein receiving the request for the web page further comprises receiving the request from a search engine.

15. The apparatus of claim 11, wherein the set of instructions cause the apparatus to:

set a flag based upon the executable script being hosted in the external domain, wherein the flag is set to indicate that the executable script is not to be executed.

16. The apparatus of claim 11, wherein the web page includes a service call that when activated, causes a search process to be performed.

17. The apparatus of claim 11, wherein the web page includes a service call that when activated, causes an optimization process to be performed.

18. The apparatus of claim 11, wherein the set of instructions cause the apparatus to:

responsive to determining that the executable script poses a security risk, block execution of the executable script.

19. The apparatus of claim 18, wherein determining if the executable script poses a security risk further comprises determining an action performed by the executable script.

20. A system, comprising:

an apparatus for responding to a request from a source for a web page containing dynamic web content, wherein the apparatus further comprises a processor programmed to execute a set of instructions a data storage element in which the set of instructions are stored, wherein when executed by the processor the set of instructions cause the apparatus to:

receive the request for the web page, the request received through an execution environment associated with a tenant among a plurality of tenants in a multi-tenant computing platform;

instantiate a virtual browser in the execution environment;

retrieve data of the web page comprising an executable script;

responsive to determining that the executable script selects user specific content as the dynamic web content based upon parameters associated with the external requestor, operate the virtual browser to execute the executable script and generate a static web page using the data of the web page and the dynamic web content;

responsive to determining that the executable script is hosted in an external domain relative to an internal domain hosting the web page, operate the virtual browser to block execution of the executable script and generate the static web page using the data of the web page; and transmit the static page to the source.

21. The system of claim 20, wherein the source is a search engine or a browser.

* * * * *